United States Patent
Chen et al.

(10) Patent No.: US 11,218,437 B2
(45) Date of Patent: Jan. 4, 2022

(54) METHOD FOR NETWORK TRAFFIC FORWARDING, REQUEST SENDING, AND COMMUNICATION ACCELERATION, FORWARDING SERVER AND NODE SERVER

(71) Applicant: WANGSU SCIENCE & TECHNOLOGY CO., LTD., Shanghai (CN)

(72) Inventors: Zhicheng Chen, Shanghai (CN); Yongkai Cai, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 119 days.

(21) Appl. No.: 16/618,957

(22) PCT Filed: Dec. 6, 2018

(86) PCT No.: PCT/CN2018/119600
§ 371 (c)(1),
(2) Date: Dec. 3, 2019

(87) PCT Pub. No.: WO2020/062582
PCT Pub. Date: Apr. 2, 2020

(65) Prior Publication Data
US 2021/0344638 A1    Nov. 4, 2021

(30) Foreign Application Priority Data
Sep. 30, 2018    (CN) .......................... 201811156784.1

(51) Int. Cl.
*G06F 15/16* (2006.01)
*G06F 12/08* (2016.01)
(Continued)

(52) U.S. Cl.
CPC .......... *H04L 61/1511* (2013.01); *H04L 67/32* (2013.01)

(58) Field of Classification Search
USPC ....... 709/245, 219, 226, 217, 203, 218, 223, 709/228, 224, 238, 233
See application file for complete search history.

(56) References Cited

U.S. PATENT DOCUMENTS

| 10,097,503 B2 * | 10/2018 | Bergman | ............ H04L 67/2842 |
| 2015/0244670 A1 * | 8/2015 | Dong | .................. H04L 61/1511 709/245 |

(Continued)

FOREIGN PATENT DOCUMENTS

| CN | 101373485 A | 2/2009 |
| CN | 101860987 A | 10/2010 |

(Continued)

OTHER PUBLICATIONS

The World Intellectual Property Organization (WIPO) International Search Report and Written Opinion for PCT/CN2018/119600 dated May 29, 2019 9 pages.
The China National Intelleectual Property Administration (CNIPA) The China Search Report for 201811156784.1 dated Dec. 5, 2019 22 Pages.

(Continued)

*Primary Examiner* — Jude Jean Gilles (57) ABSTRACT

The present disclosure relates to the field of data processing technology, and more particularly, relates to a method for network traffic forwarding, request sending, and communication acceleration, a forwarding server and a node server. The network traffic forwarding method includes: receiving a first access request carrying an acceleration domain name from a user terminal and determining whether an origin site domain name corresponding to the acceleration domain name exists; if the origin site domain name exists, obtaining (Continued)

the origin site domain name corresponding to the acceleration domain name according to a first pre-set rule; and sending a second access request carrying the origin site domain name and corresponding origin site address information to an Internet acceleration platform to perform an accelerated transmission process in response to the second access request.

15 Claims, 6 Drawing Sheets

(51) Int. Cl.
*G06F 12/00* (2006.01)
*G06F 15/173* (2006.01)
*H04L 29/12* (2006.01)
*H04L 29/08* (2006.01)
*H04W 4/00* (2018.01)
*H04W 8/18* (2009.01)
*H04W 4/21* (2018.01)
*H04W 4/02* (2018.01)

(56) References Cited

U.S. PATENT DOCUMENTS

| | | | |
|---|---|---|---|
| 2017/0085674 A1 | | 3/2017 | Carney et al. |
| 2017/0295451 A1* | | 10/2017 | Kim ........................ H04W 4/60 |
| 2018/0262351 A1* | | 9/2018 | Liu ........................ G06F 16/95 |

FOREIGN PATENT DOCUMENTS

| | | |
|---|---|---|
| CN | 102611756 A | 7/2012 |
| CN | 103428310 A | 12/2013 |
| CN | 107347085 A | 12/2013 |
| CN | 104320335 A | 1/2015 |
| CN | 104394182 A | 3/2015 |
| CN | 106790704 A | 5/2017 |
| CN | 107612759 A | 1/2018 |
| CN | 107995314 A | 5/2018 |
| WO | 2012052568 A1 | 4/2012 |

OTHER PUBLICATIONS

The China National Intelleectual Property Administration (CNIPA) The China Search Report for 201811156784.1, dated Jul. 17, 2020 23 Pages.

* cited by examiner

METHOD FOR NETWORK TRAFFIC FORWARDING, REQUEST SENDING, AND COMMUNICATION ACCELERATION, FORWARDING SERVER AND NODE SERVER

CROSS-REFERENCES TO RELATED APPLICATIONS

This application is a national phase entry under 35 U.S.C § 371 of International Application No. PCT/CN2018/119600, filed on Dec. 6, 2018, which claims priority of Chinese Patent Application No. 201811156784.1, filed with the State Intellectual Property Office of P. R. China on Sep. 30, 2018, the entire contents of all of which are incorporated herein by reference.

FIELD OF THE DISCLOSURE

The present disclosure relates to the field of data processing technology, and more particularly, relates to a method for network traffic forwarding, request sending, and communication acceleration, a forwarding server and a node server.

BACKGROUND

With the development of the Internet, users are increasingly dependent on information technology. Accessing an ERP system, an order placing system, a trading website, and other daily businesses all require exchanging information through the Internet. Thus, the quality of the Internet transmission links is critical for people (e.g., quality parameters such as a transmission speed, a delay and a packet loss rate of the transmission link). To obtain desired online experience, more and more users subscribe to the Internet acceleration service.

In the existing Internet acceleration service, an Internet acceleration access device needs to be deployed at the egress of user's local area network. A user's access request is directed to an Internet acceleration platform through the Internet acceleration access device. The Internet acceleration platform speedily transmits the access request to an origin site that the user needs to access. However, the inventors discovered the following problems in the existing technology: (1) in the existing Internet acceleration service, the user is required to deploy the Internet acceleration access device to achieve network traffic forwarding, thereby limiting the user to the local area network where the Internet acceleration access device is located in order to take advantage of the Internet acceleration service. If the user physically leaves the area where the local area network is located (e.g., traveling), the user no longer has the access to the Internet acceleration service (the user is unlikely to carry the Internet acceleration access device when traveling). That is, the application scenario of the Internet acceleration service is limited; (2) It is not suitable for users who have a stringent information security requirement (because the users who have the stringent information security requirement, such as the users in the financial industry, are not allowed to deploy additional hardware devices in their local area network); (3) deploying the hardware device on the user side increases the cost for the user (e.g., hardware cost, maintenance cost, etc.)

BRIEF SUMMARY OF THE DISCLOSURE

The objective of the present disclosure is to provide a method for network traffic forwarding, request sending, and communication acceleration, a forwarding server, and a node server. As such, no longer limited by the Internet access scenarios, users may enjoy the Internet acceleration service to meet the demand of fast accesses to designated websites in any scenarios. It is a great relief to the users by removing the hardware device deployed on the user side, satisfying the stringent information security requirement, and reducing the cost of the users.

To solve the problems in the existing technology, one aspect of the present disclosure provides a network traffic forwarding method to be applied to a forwarding server. The method includes: receiving a first access request carrying an acceleration domain name from a user terminal and determining whether an origin site domain name corresponding to the acceleration domain name exists; if the origin site domain name exists, obtaining the origin site domain name corresponding to the acceleration domain name according to a first pre-set rule; and sending a second access request carrying the origin site domain name and corresponding origin site address information to an Internet acceleration platform to perform an accelerated transmission process in response to the second access request.

Another aspect of the present disclosure provides a request sending method to be applied to a user terminal. The method includes: sending a second DNS resolution request carrying an acceleration domain name to a second DNS server, and receiving address information of a forwarding server corresponding to the acceleration domain name fed back by the second DNS server; and sending a first access request carrying the acceleration domain name to the forwarding server according to the address information of the forwarding server for the forwarding server to forward a second access request derived from the first access request to an Internet acceleration platform.

Another aspect of the present disclosure provides a communication acceleration method to be applied to a node server of an Internet acceleration platform. The method includes: receiving a second access request carrying an origin site domain name and address information of the origin site from a forwarding server and obtaining a route transmission link between a node server and an origin server corresponding to the address information of the origin site; and sending the second access request to the origin site server through the route transmission link.

Another aspect of the present disclosure provides a forwarding server. The forwarding server includes: at least one processor; and a memory connected to the at least one processor. The memory stores instructions to be executed by the at least one processor; and the instructions are executed by the at least one processor to implement the disclosed network traffic forwarding method.

Another aspect of the present disclosure provides a user terminal. The user terminal includes: at least one processor; and a memory connected to the at least one processor. The memory stores instructions to be executed by the at least one processor; and the instructions are executed by the at least one processor to implement the disclosed request sending method.

Another aspect of the present disclosure provides a node server. The node server includes: at least one processor; and a memory connected to the at least one processor. The memory stores instructions to be executed by the at least one processor; and the instructions are executed by the at least one processor to implement the disclosed communication acceleration method.

Another aspect of the present disclosure provides a computer readable storage medium configured to store a computer program. The computer program is executed by a processor to implement the disclosed network traffic forwarding method.

Another aspect of the present disclosure provides a computer readable storage medium configured to store a computer program. The computer program is executed by a processor to implement the disclosed request sending method.

Another aspect of the present disclosure provides a computer readable storage medium configured to store a computer program. The computer program is executed by a processor to implement the disclosed communication acceleration method.

Compared with the existing technology, the present disclosure provides the network traffic forwarding method to be applied to the forwarding server. That is, the first access request carrying the acceleration domain name is received from the user terminal. If it is determined that the origin site domain name corresponding to the acceleration domain name exists, the first pre-set rule is used to obtain the origin site domain name corresponding to the acceleration domain name. The second access request carrying the origin site domain name and the corresponding origin site address information is sent to the Internet acceleration platform. The Internet acceleration platform performs an Internet acceleration process in response to the second access request. The use of the Internet acceleration access device in the existing technology is replaced by the solution that forwards the access request from the user terminal to the Internet acceleration platform. As such, no longer limited by the Internet access scenarios, the user may enjoy the Internet acceleration service to meet the demand of fast accesses to designated websites in any scenarios. It is a great relief to the users by removing the hardware device deployed on the user side, satisfying the stringent information security requirement, and reducing the cost of the users.

Further, obtaining the origin site domain name corresponding to the acceleration domain name according to the first pre-set rule includes: obtaining the origin site domain name corresponding to the acceleration domain name according to a pre-stored pre-set mapping relationship between the acceleration domain name and the origin site domain name. The method for obtaining the origin site domain name is provided.

Further, the pre-set mapping relationship between the acceleration domain name and the origin site domain name is stored in a list. Before obtaining the origin site domain name corresponding to the acceleration domain name according to the first pre-set rule, the method further includes: obtaining the number of times the acceleration domain name included in the first access request is accessed; and based on the obtained number of times, sorting the list of the pre-set mapping relationship. Obtaining the origin site domain name corresponding to the acceleration domain name according to the pre-stored pre-set mapping relationship between the acceleration domain name and the origin site domain name includes: obtaining the origin site domain name corresponding to the acceleration domain name according to the sorted list. Because the pre-set mapping relationship corresponding to the acceleration domain name having the large number of times of the accesses appears in the front of the list, obtaining the origin site domain name corresponding to the acceleration domain name according to the sorted list improves a speed of obtaining the origin site domain name.

Further, after sending the second access request carrying the origin site domain name and corresponding origin site address information to the Internet acceleration platform to perform the accelerated transmission process in response to the second access request, the method further includes: receiving a response result fed back by the origin site server from the Internet acceleration platform in response to the second access request and extracting the origin site domain name from the response result; when it is determined the acceleration domain name corresponding to the origin site domain name exists, obtaining the acceleration domain name corresponding to the origin site domain name according to a second pre-set rule; and sending the response result carrying the acceleration domain name to the user terminal. As such, through the forwarding server, the user may enjoy the Internet acceleration service to meet the demand of fast accesses to designated websites in any scenarios.

Further, receiving the response result from the origin site server in response to the second access request includes: receiving the response result from the origin site server through the route transmission link. The response result returns back to the user terminal through an original route transmission link. As such, the response result can be transmitted to the user terminal through the route transmission link having a fast transmission speed and the user experience is further improved.

Further, obtaining the route transmission link between the node server and the origin site server corresponding to the address information of the origin site includes: obtaining a plurality of route links between the node server and the origin site server corresponding to the address information of the origin site; calculating a link parameter for each route link according to a pre-set shortest path algorithm; and selecting the route transmission link according to the link parameter for each route link. The method for obtaining the route transmission link is provided. As such, the second access request can be transmitted to the origin site server through the route transmission link having the fast transmission speed and the communication speed is further accelerated

BRIEF DESCRIPTION OF THE DRAWINGS

In order to more clearly illustrate the technical solutions in the embodiments of the present disclosure, drawings used in the description of the embodiments will be briefly described below. The drawings in the following description are only some embodiments of the present disclosure. Other drawings may also be obtained by those of ordinary skill in the art without inventive work. Elements in the drawings identified by same numerical labels are similar elements. The dimensions in the drawings do not constitute a scale limitation unless otherwise stated.

DETAILED DESCRIPTION

To make the objectives, technical solutions, and advantages of the present disclosure clearer, the following further describes the embodiments of the present disclosure in details with reference to the accompanying drawings. It should be understood by those skilled in the art that the foregoing are merely certain preferred embodiments of the present disclosure and are not intended to limit the present invention. Without departing from the spirit and principles of the present disclosure, any modifications, equivalent substitutions, and improvements, etc. shall fall within the scope of the present disclosure.

Figure 1:
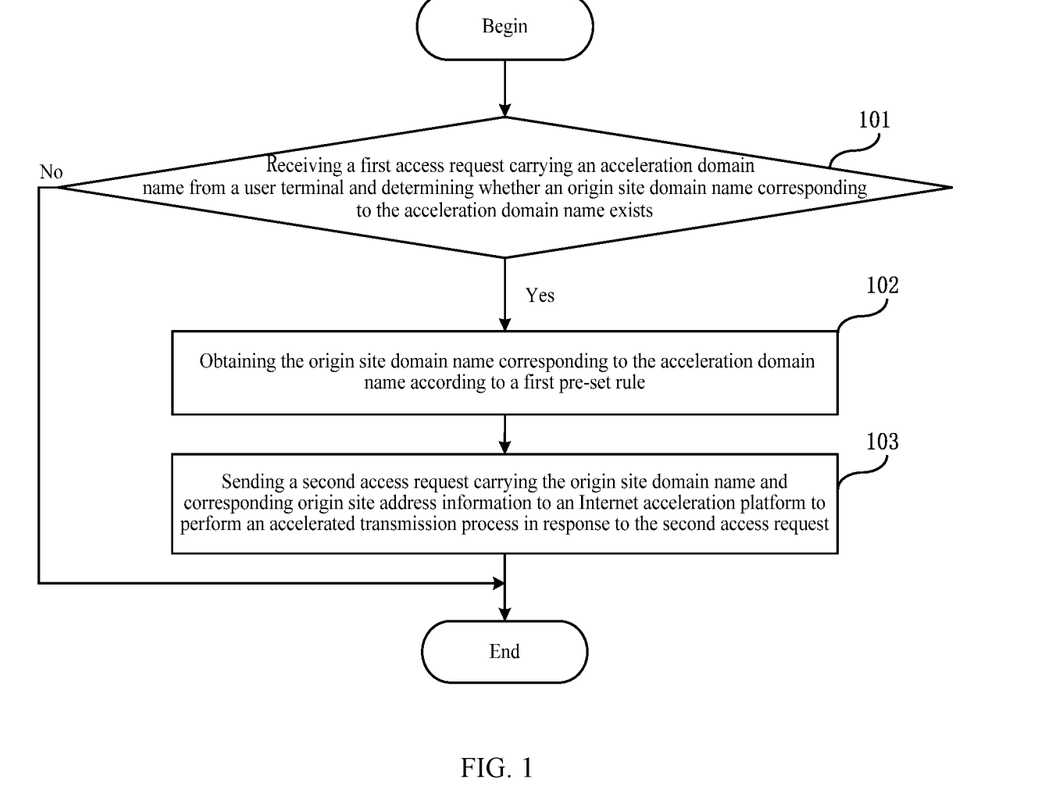
FIG. 1 illustrates a flowchart of an exemplary network traffic forwarding method according to disclosed embodiments of the present disclosure.

The present disclosure provides a network traffic forwarding method to be applied to a forwarding server. As shown in FIG. 1, the network traffic forwarding method includes the following steps.

Step 101: receiving a first access request carrying an acceleration domain name from a user terminal and determining whether an origin site domain name corresponding to the acceleration domain name exists; if true, executing step 102, otherwise ending the process.

In one embodiment, the forwarding server is a node server connected with the user terminal and an Internet acceleration platform.

In one example, the user terminal informs an acceleration service provider of an origin site domain name abc.com that needs to be accelerated. Based on the origin site domain name, an acceleration server obtains the acceleration domain name according to a first pre-set rule configured in the forwarding server and informs the user terminal that the acceleration domain name corresponding to the origin site domain name is xyz.com. The domain names are for illustrative purposes and do not limit the present disclosure.

In one embodiment, after the first access request is received, the acceleration domain name is extracted from the first access request. For example, the acceleration domain name may be extracted from the first access request by using a regular expression (however the extraction method is not limited to using the regular expression). Then, whether an extracted origin site domain name corresponding to the acceleration domain name exists is determined.

In another example, the forwarding server is pre-stored with a list of mapping relationship between acceleration domain names and origin site domain names. The mapping relationship list may be scanned to identify the acceleration domain name and the corresponding origin site domain name. The process for determining whether the origin site domain name corresponding to the acceleration domain name exists is for illustrative purposes and is not intended to limit the present disclosure.

Step 102: obtaining the origin site domain name corresponding to the acceleration domain name according to a first pre-set rule.

In one example, the first pre-set rule may be a formula for conversion between the acceleration domain name and the origin site domain name. The acceleration domain name is converted to the origin site domain name through the conversion formula. The first pre-set rule described in the example is for illustrative purposes and is not intended to limit the present disclosure.

Step 103: sending a second access request carrying the origin site domain name and corresponding origin site address information to an Internet acceleration platform to perform an accelerated transmission process in response to the second access request.

In one example, the forwarding server may rewrite the acceleration domain name in an URL included in the first access request to the corresponding origin site domain name to form the URL that carries the origin site domain name. The second access request includes the URL carrying the origin site domain name. The example is for illustrative purposes and is not intended to limit the present disclosure. In another example, the forwarding server may add the origin site domain name to a pre-set position in the URL included in the first access request to form the URL that carries the origin site domain name.

In one example, the user terminal initiates the first access request for an image resource to the forwarding server. The first access request received by the forwarding server includes the URL http://xyz.com/abc.jpg. The forwarding server determines that the origin site domain name corresponding to the acceleration domain name exists, obtains the origin site domain name abc.com according to the first pre-set rule, rewrites the URL http://xyz.com/abc.jpg into http://abc.com/abc.jpg, and sends the second access request including the URL http://abc.com/abc.jpg to the Internet acceleration platform. The example is for illustrative purposes and is not intended to limit the present disclosure.

In one example, a requested object of the first access request is a single element image file. After the origin site domain name corresponding to the acceleration domain name in the first access request is obtained, the acceleration domain name (e.g., xyz.com) included in a host URL and a request URL in the http request header in the first access request may be rewritten into the corresponding origin site domain name (e.g., rewriting xyz.com into abc.com).

Compared with the existing technology, the present disclosure provides the network traffic forwarding method to be applied to the forwarding server. That is, the first access request carrying the acceleration domain name is received from the user terminal. If it is determined that the origin site domain name corresponding to the acceleration domain name exists, the first pre-set rule is used to obtain the origin site domain name corresponding to the acceleration domain name. The second access request carrying the origin site domain name and the corresponding origin site address information is sent to the Internet acceleration platform. The Internet acceleration platform performs an Internet acceleration process in response to the second access request. The use of the Internet acceleration access device in the existing technology is replaced by the solution that forwards the access request from the user terminal to the Internet acceleration platform. As such, no longer limited by the Internet access scenarios, the user may enjoy the Internet acceleration service to meet the demand of fast accesses to designated websites in any scenarios. It is a great relief to the users by removing the hardware device deployed on the user side, satisfying the stringent information security requirement, and reducing the cost of the users.

The implementation of the network traffic forwarding method provided by the present disclosure are described in detail below. The implementation details are provided for illustrative purposes and are not intended to limit the present disclosure.

In one example, the origin site domain name corresponding to the acceleration domain name is obtained according to the first pre-set rule. The origin site domain name corresponding to the acceleration domain name is obtained according to the pre-stored pre-set mapping relationship between the acceleration domain name and the origin site domain name. That is, the service provider pre-configures the pre-set mapping relationship between the acceleration domain name and the origin site domain name in the forwarding server. The present disclosure provides an exemplary method for obtaining the origin site domain name corresponding to the acceleration domain name.

In one example, the forwarding server sends the second access request carrying the origin site domain name and the corresponding origin site address information to the Internet acceleration platform. Specifically, the forwarding server sends a first DNS resolution request carrying the origin site domain name to a first DNS server, and receives the origin site address information of the origin site server correspondingly resolved according to the origin site domain name from the first DNS server. The forwarding server sends the second access request carrying the origin site domain name and the corresponding origin site address information to the Internet acceleration platform. After receiving the first DNS resolution request from the forwarding server, the first DNS server locally searches for the domain name resolution record corresponding to the origin site domain name. If found, the first DNS server sends the corresponding origin site address information (e.g., IP address) to the forwarding server. If the domain name resolution record corresponding to the origin site domain name is not found locally, the first DNS server sends an iterative query to an authoritative domain name server of the origin site domain name and receives the corresponding origin site address information from the authoritative domain name server. The example is for illustrative purposes and the method for obtaining the origin site address information corresponding to the origin site server is not intended to limit the present disclosure.

In one embodiment, before the origin site domain name corresponding to the acceleration domain name is obtained according to the first pre-set rule at step 102, the method further includes receiving an update request of the first pre-set rule and updating the first pre-set rule corresponding to the acceleration domain name. In this case, it facilitates configuring the first pre-set rule.

Various steps of the disclosed method are divided for the convenience of illustration and may be combined or further divided in actual implementations. As long as same logical relationships are maintained, re-arranged steps are still within the scope of the present disclosure. Any modifications and design changes introduced in the algorithm or flowchart without changing the core design of the algorithm or flowchart are covered by the present disclosure.

Figure 2:
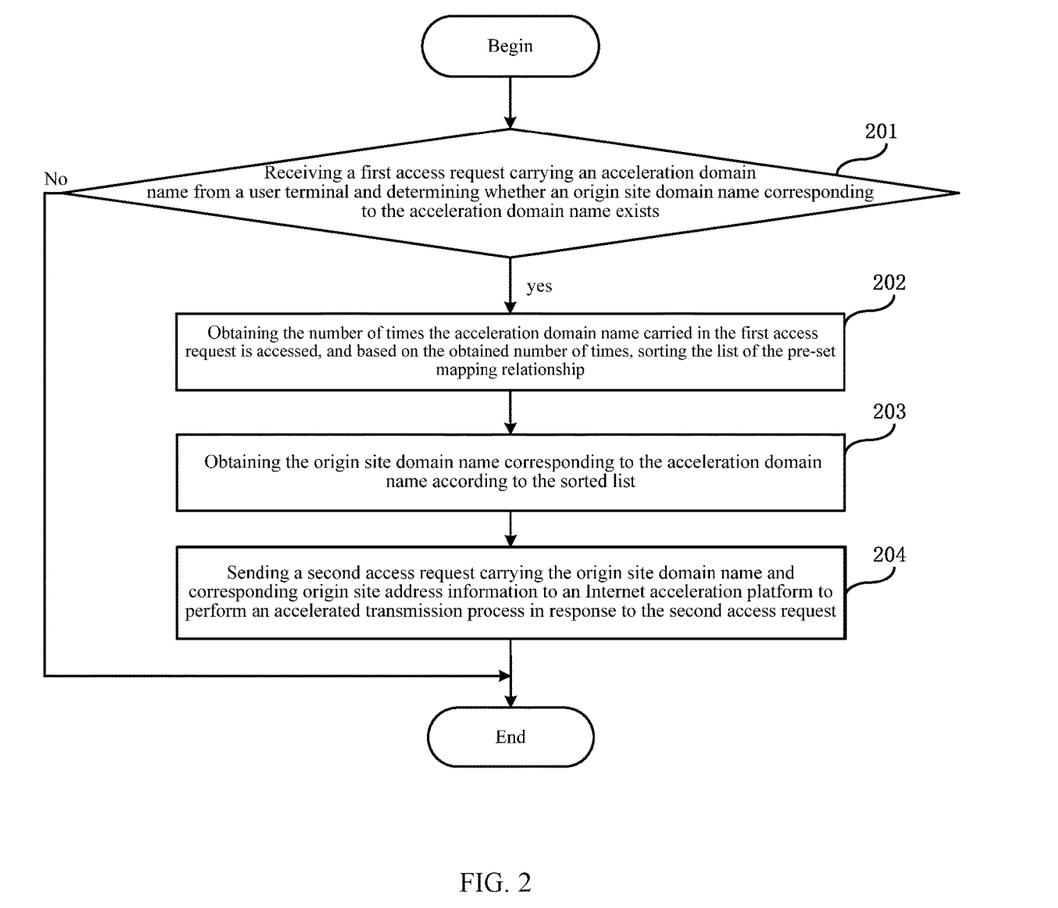
FIG. 2 illustrates a flowchart of another exemplary network traffic forwarding method according to disclosed embodiments of the present disclosure.

In one embodiment, as shown in FIG. 2, another network traffic forwarding method is provided. The method in FIG. 2 is improved over the method in FIG. 1 and provides a process for quickly obtaining the origin site domain name corresponding to the acceleration domain name.

In the embodiments of the present disclosure, step 201 and step 204 in FIG. 2 are identical to step 101 and step 103 in FIG. 1 and will not be repeated hereinafter. The method also includes other steps described as follows.

Step 202: obtaining the number of times the acceleration domain name carried in the first access request is accessed, and based on the obtained number of times, sorting the list of the pre-set mapping relationship.

In one embodiment, the pre-set mapping relationship between the acceleration domain name and the origin site domain name is stored in a list. Each time the forwarding server receives one first access request, it indicates that the acceleration domain name included in the first access request is accessed once.

In one example, the forwarding server records in real time the number of times each acceleration domain name is accessed, such that the number of times the acceleration domain is accessed can be obtained. The list of the pre-set mapping relationship between the acceleration domain name and the origin site domain name is sorted repeatedly based on the number of times of accesses, such that the pre-set mapping relationship corresponding to the acceleration domain name having the large number of times of accesses appears in the front of the list. The example is for illustrative purposes and the process for sorting the pre-set mapping relationship is not intended to limit the present disclosure.

Step 203: obtaining the origin site domain name corresponding to the acceleration domain name according to the sorted list.

Compared to the method in FIG. 1, in the method in FIG. 2, the first pre-set rule is the pre-set mapping relationship between the acceleration domain name and the origin site domain name. The mapping relationship is stored in the list. The number of times the acceleration domain name carried in the first access request is accessed is obtained. The pre-set mapping relationship in the list is sorted according to the number of times of the accesses. The origin site domain name corresponding to the acceleration domain name is obtained according to the sorted list. Because the pre-set mapping relationship corresponding to the acceleration domain name having the large number of times of the accesses appears in the front of the list, obtaining the origin site domain name corresponding to the acceleration domain name according to the sorted list improves a speed of obtaining the origin site domain name.

Figure 3:
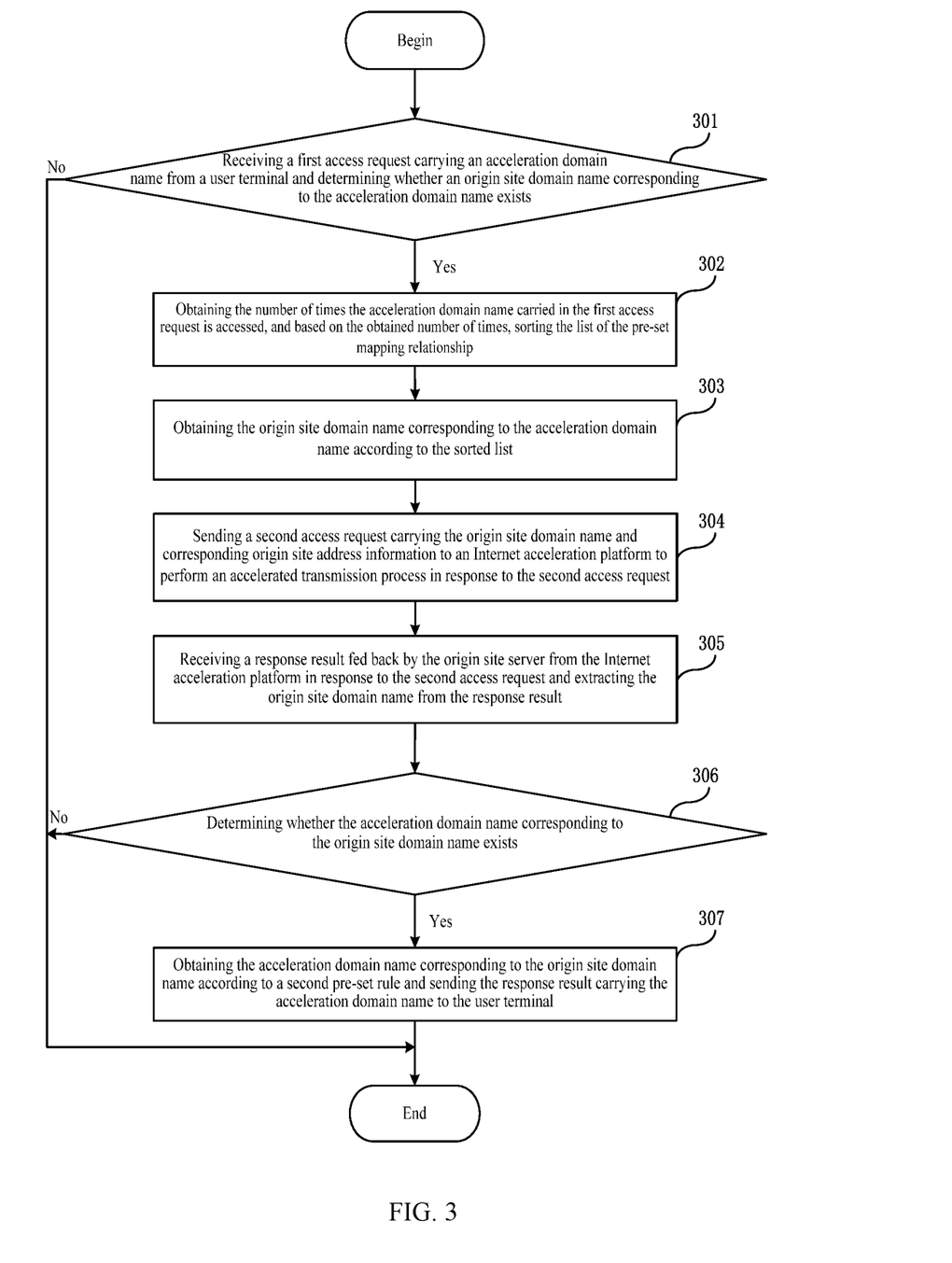
FIG. 3 illustrates a flowchart of another exemplary network traffic forwarding method according to disclosed embodiments of the present disclosure.

In one embodiment, as shown in FIG. 3, another network traffic forwarding method is provided. The method in FIG. 3 is improved over the method in FIG. 2. In the method in FIG. 3, the forwarding server forwards a response result by the origin site server in response to the user terminal to the user terminal.

In the embodiments of the present disclosure, step 301, step 302, step 303, and step 304 in FIG. 3 are identical to step 201. Step 202, step 203, and step 204 in FIG. 2 and will not be repeated hereinafter. The method also includes other steps described as follows.

Step 305: receiving a response result fed back by the origin site server from the Internet acceleration platform in response to the second access request and extracting the origin site domain name from the response result.

In one embodiment, the forwarding server receives the response result fed back by the origin site server from one of node servers of the Internet acceleration platform.

In one example, the user terminal initiates the first access request for an image resource to the forwarding server. After the forwarding server receives the response result fed back by the origin site server, the forwarding server extracts the origin site domain name from the header information of the http response. The example is for illustrative purposes and the resource type in the request initiated by the user terminal is not intended to limit the present disclosure.

In another example, the object requested by the first access request is a page file. That is, the user terminal initiates the first access request for the page file to the forwarding server. Obtaining the origin site domain name from the response result includes obtaining the origin site domain name included in the traversed page file. For example, the page file index.html is embedded with an image resource URL http://abc.com/abc.jpg. The embedded domain name is extracted. The example is for illustrative purposes and the resource type in the request initiated by the user terminal is not intended to limit the present disclosure.

In another example, the object requested by the first access request is a redirected URL. The forwarding server extracts the origin site domain name from the location URL in the http response header in the response result. The example is for illustrative purposes and the resource type in the request initiated by the user terminal is not intended to limit the present disclosure.

Step 306: determining whether the acceleration domain name corresponding to the origin site domain name exists, if true, executing step 307, otherwise ending the process.

In one example, the forwarding server is pre-stored with the list of the mapping relationship between the acceleration domain name and the origin site domain name. The list of the mapping relationship is scanned to identify whether the origin site domain name and the acceleration domain name corresponding to the origin site domain name exist. The example is for illustrative purposes and the process for determining whether the acceleration domain name corresponding to the origin site domain name exists is not intended to limit the present disclosure.

Step 307: obtaining the acceleration domain name corresponding to the origin site domain name according to a second pre-set rule and sending the response result carrying the acceleration domain name to the user terminal.

In one example, the acceleration domain name corresponding to the origin site domain name is obtained according to the second pre-set rule. The acceleration domain name corresponding to the origin site domain name is obtained according to the pre-stored pre-set mapping relationship between the acceleration domain name and the origin site domain name. That is, the service provider pre-configures the pre-set mapping relationship between the acceleration domain name and the origin site domain name in the forwarding server. The present disclosure provides an exemplary method for obtaining the acceleration domain name corresponding to the origin site domain name.

In one example, the origin site domain name in the response result is replaced by the corresponding acceleration domain name to form the response result carrying the acceleration domain name. For example, the origin site domain name abc.com is replaced by the acceleration domain name xyz.com.

In one example, the object requested by the first access request is the page file index.html. After the forwarding server receives the response result index.html, the forwarding server obtains the acceleration domain name xyz.com corresponding to the origin site domain name abc.com for the image resource URL http://abc.com/abc.jpg embedded in the page file index.html. The URL http://abc.com/abc.jpg is rewritten as URL http//xyz.com/abc.jpg. The forwarding server sends the page file index.html including the image resource URL http://xyz.com/abc.jpg to the user terminal. The example is for illustrative purposes and is not intended to limit the present disclosure.

In one example, the object requested by the first access request is the redirected URL. The forwarding server receives the response result including URL http://abc.com and a status code indicating redirecting (e.g., http 301, 302, 303, 307). The forwarding server obtains the acceleration domain name xyz.com corresponding to the origin site domain name abc.com and rewrites URL http://abc.com into http://xyz.com. The forwarding server sends the URL http://xyz.com including the status code and the rewritten location to the user terminal. The example is for illustrative purposes and is not intended to limit the present disclosure.

Practically, the method in FIG. 3 may also be improved over the method in FIG. 1.

Compared to the method in FIG. 2, in the method in FIG. 3, the response result fed back by the origin site server is sent to the user terminal through the forwarding server. That is, the forwarding server receives the response result fed back by the origin site server in response to the second access request from the Internet acceleration platform and obtains the origin site domain name from the response result. When it is determined that the acceleration domain name corresponding to the origin site domain name exists, the forwarding server obtains the acceleration domain name corresponding to the origin site domain name according to the second pre-set rule and sends the response result carrying the acceleration domain name to the user terminal. As such, through the forwarding server, the user may enjoy the Internet acceleration service to meet the demand of fast accesses to designated websites in any scenarios.

Figure 4:
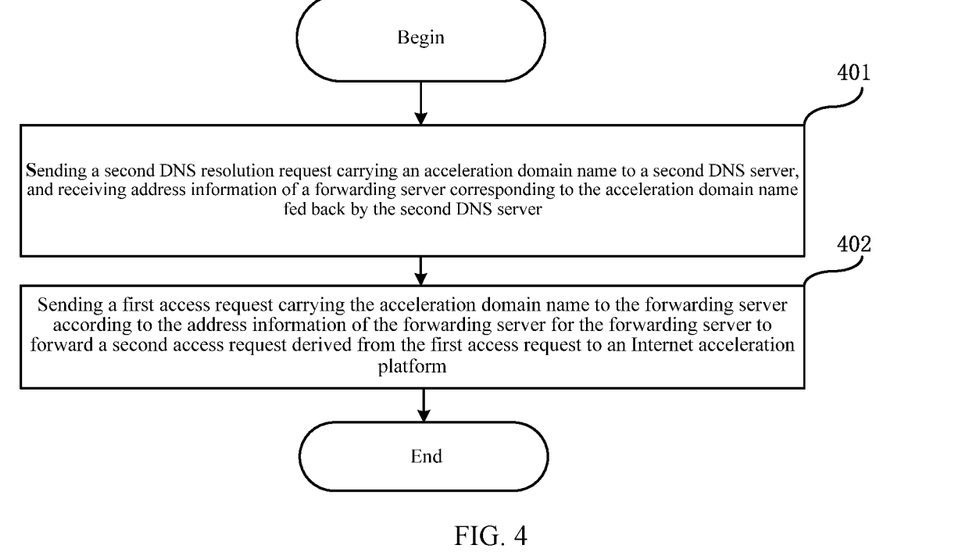
FIG. 4 illustrates a flowchart of an exemplary request sending method according to disclosed embodiments of the present disclosure.

In one embodiment, as shown in FIG. 4, a request sending method is provided. The method in FIG. 4 is applied to a user terminal, such as a mobile phone or a computer. As shown in FIG. 4, the request sending method includes the following steps.

Step 401: sending a second DNS resolution request carrying an acceleration domain name to a second DNS server, and receiving address information of a forwarding server corresponding to the acceleration domain name fed back by the second DNS server.

In one example, an acceleration service provider pre-configures a resolution address information as the address information of the forwarding server (e.g., IP address of the forwarding server) in the second DNS server.

In one example, the second DNS server may be deployed in the user's local area network or may be provided by the service provider. The ownership of the second DNS server is not limited by the present disclosure.

In one example, the address information of the forwarding server may be, but is not limited to, the IP address of the forwarding server, or may be address information of other types. In one embodiment, the acceleration service provider pre-configures the pre-set mapping relationship between the acceleration domain name and the IP address of the forwarding server in the authoritative domain name server.

In one example, after receiving the second DNS resolution request, the second DNS server searches for the domain name resolution record corresponding to the acceleration domain name locally. If found, the second DNS server sends the IP address of the forwarding server corresponding to the acceleration domain name to the user terminal. If the domain name resolution record corresponding to the acceleration domain name is not found locally, the second DNS server sends an iterative query to an authoritative domain name server of the acceleration domain name, receives the IP address of the forwarding server corresponding to the acceleration domain name from the authoritative domain name server, saves and sends the IP address of the forwarding server to the user terminal. The example is for illustrative purposes and the process for resolving the acceleration domain name is not intended to limit the present disclosure.

Step 402: sending a first access request carrying the acceleration domain name to the forwarding server according to the address information of the forwarding server for the forwarding server to forward a second access request derived from the first access request to an Internet acceleration platform.

Compared with the existing technology, the present disclosure provides the request sending method. That is, the second DNS resolution request is sent to the second DNS server. The address information of the forwarding server corresponding to the acceleration domain name is fed back by and received from the second DNS server. The first access request is sent to the forwarding server according to the address information of the forwarding server. The forwarding server forwards the second access request derived from the first access request to the Internet acceleration platform. As such, the user terminal achieves accessing the origin site server.

Various steps of the disclosed method are divided for the convenience of illustration and may be combined or further divided in actual implementations. As long as same logical relationships are maintained, re-arranged steps are still within the scope of the present disclosure. Any modifications and design changes introduced in the algorithm or flowchart without changing the core design of the algorithm or flowchart are covered by the present disclosure.

Figure 5:
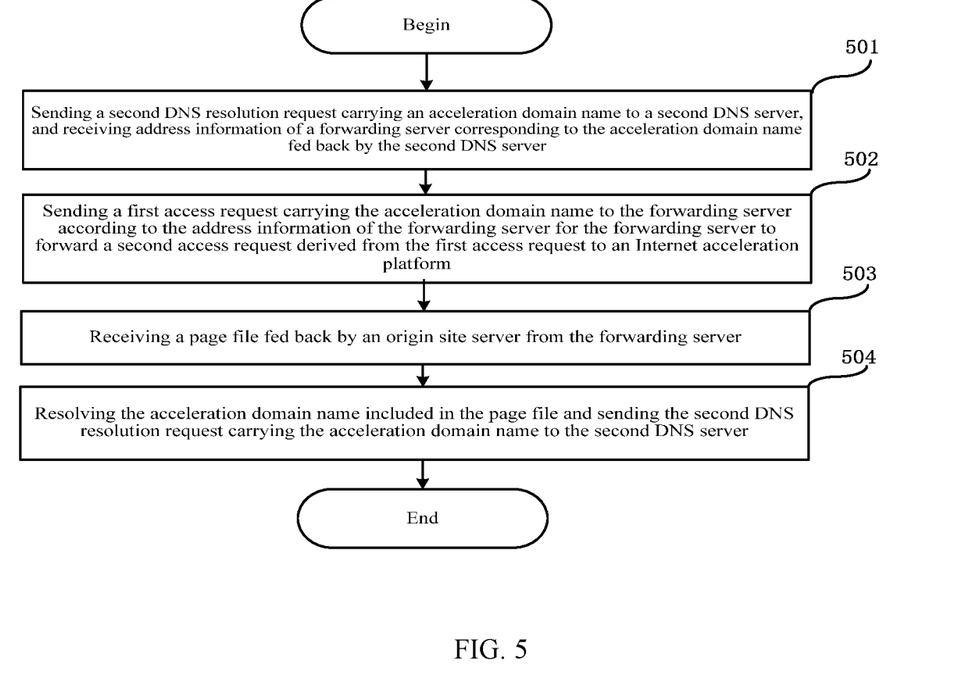
FIG. 5 illustrates a flowchart of another exemplary request sending method according to disclosed embodiments of the present disclosure.

In one embodiment, as shown in FIG. 5, another request sending method is provided. The method in FIG. 5 is improved over the method in FIG. 4. In FIG. 5, the request sending method is provided when the object requested by the user terminal is a page file or a redirected URL.

In one example, as shown in FIG. 4 and FIG. 5, step 501 and step 502 are identical to step 401 and step 402, and will not be repeated hereinafter. The method in FIG. 5 further includes other steps described as follows.

Step 503: receiving a page file fed back by an origin site server from the forwarding server.

In one embodiment, the object requested by the first access request is the page file. That is, the response result fed back by the origin site server is the page file. The response result is accelerated by the Internet acceleration platform to be sent to the forwarding server. The forwarding server forwards the response result to the user terminal.

Step 504: resolving the acceleration domain name included in the page file and sending the second DNS resolution request carrying the acceleration domain name to the second DNS server.

In one example, the user terminal resolves the acceleration domain name xyz.com included in the page file index.html and initiates the access request directed to URL http://xyz.com/abc.jpg. The example is for illustrative purposes and is not intended to limit the present disclosure. For example, the page file may include multiple acceleration domain names.

Figure 6:
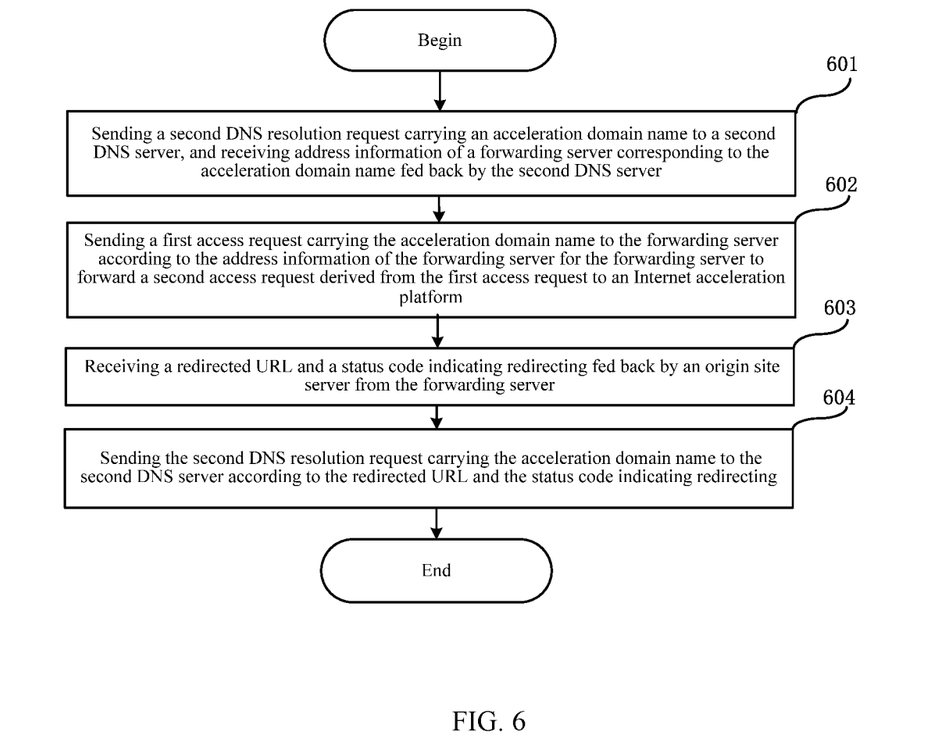
FIG. 6 illustrates a flowchart of an exemplary request sending method according to disclosed embodiments of the present disclosure.

In another example, as shown in FIG. 6, another request sending method is provided. As shown in FIG. 4 and FIG. 6, step 601 and step 602 are identical to step 401 and step 402 and will not be repeated hereinafter. The method in FIG. 6 further includes other steps described as follows.

Step 603: receiving a redirected URL and a status code indicating redirecting fed back by an origin site server from the forwarding server.

In one embodiment, the object requested by the first access request is the redirected URL. That is, the response result fed back by the origin site server is the redirected URL and the status code indicating redirecting.

Step 604: sending the second DNS resolution request carrying the acceleration domain name to the second DNS server according to the redirected URL and the status code indicating redirecting.

In one embodiment, the redirected URL includes the acceleration domain name.

In one example, the redirected URL http://xyz.com and the status code 302 are received from the forwarding server. The user terminal initiates the access request directed to URL http://xyz.com. For example, the default response to the URL http://xyz.com by the origin site server is the page file index.html. In fact, the user initiates the access request directed to the page file http://xyz.com/index.html. The example is for illustrative purposes and is not intended to limit the present disclosure.

Compared with the method in FIG. 4, in the method in FIG. 5 and FIG. 6, when the object requested by the origin site server request from the user terminal is the page file, after receiving the page file fed back by the origin site server from the forwarding server, the user terminal resolves the acceleration domain name included in the page file and initiates the access request directed to the URL corresponding to the acceleration domain name, thereby obtaining the resource included in the page file. In addition, when the object requested by the origin site server request from the user terminal is the redirected URL, after receiving the redirected URL and the status code fed back by the origin site server from the forwarding server, the user terminal initiates the access request directed to the redirected URL, thereby obtaining the resource corresponding to the redirected URL.

Figure 7:
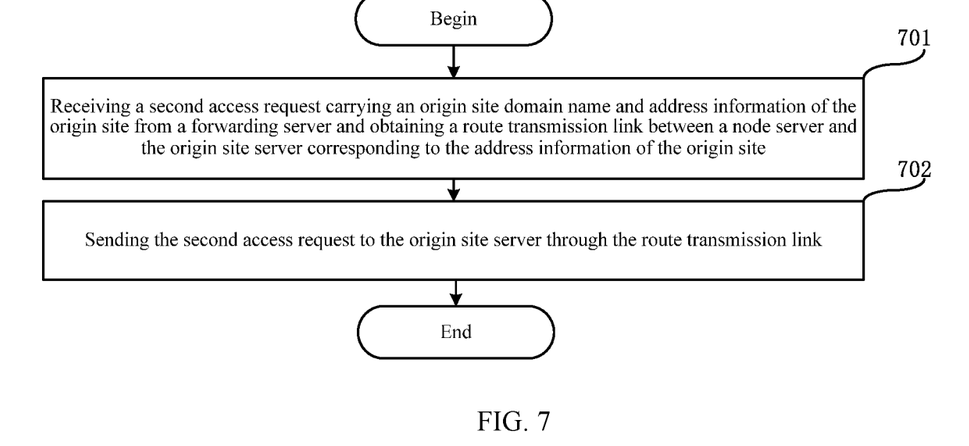
FIG. 7 illustrates a flowchart of an exemplary communication acceleration method according to disclosed embodiments of the present disclosure.

In one embodiment, as shown in FIG. 7, a communication acceleration method is provided. The method in FIG. 7 is applied to a node server of the Internet acceleration platform. As shown in FIG. 7, the communication acceleration method includes the following steps.

Step 701: receiving a second access request carrying an origin site domain name and address information of the origin site from a forwarding server and obtaining a route transmission link between a node server and the origin site server corresponding to the address information of the origin site.

Step 702: sending the second access request to the origin site server through the route transmission link.

Compared with the existing technology, the present disclosure provides the communication acceleration method to be applied to the node server. That is, the second access request is received from the forwarding server. The route transmission link between the node server and the origin site server is obtained. The second access request is sent to the origin site server through the route transmission link. The Internet acceleration platform performs the accelerated transmission process the access request forwarded by the forwarding server. As such, the user terminal can quickly access the origin site server to obtain the to-be-accessed resource.

Various steps of the disclosed method are divided for the convenience of illustration and may be combined or further divided in actual implementations. As long as same logical relationships are maintained, re-arranged steps are still within the scope of the present disclosure. Any modifications and design changes introduced in the algorithm or flowchart without changing the core design of the algorithm or flowchart are covered by the present disclosure.

Figure 8:
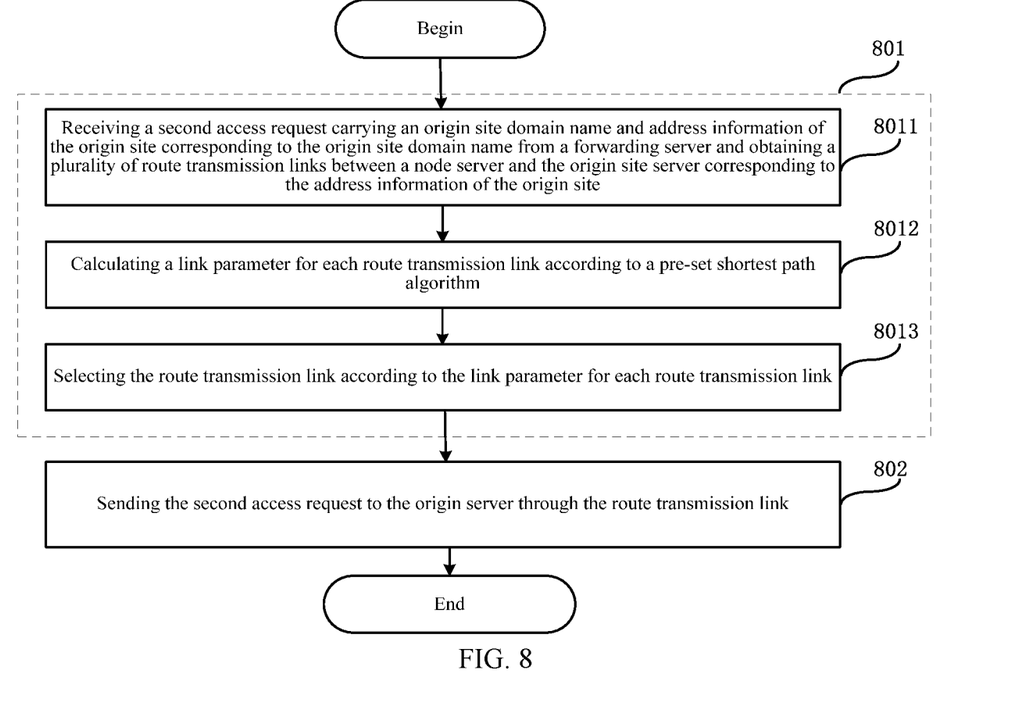
FIG. 8 illustrates a flowchart of another exemplary communication acceleration method according to disclosed embodiments of the present disclosure.

In one embodiment, as shown in FIG. 8, another communication acceleration method is provided. The method in FIG. 8 is improved over the method in FIG. 7. In the method in FIG. 8, a process of obtaining the route transmission link is provided.

In one example, as shown in FIG. 7 and FIG. 8, step 802 is identical to step 702, and will not be repeated hereinafter. In the method in FIG. 8, step 801 further includes the following sub-steps.

Sub-step 8011: receiving a second access request carrying a origin site domain name and address information of the origin site corresponding to the origin site domain name from a forwarding server and obtaining a plurality of route links between a node server and the origin site server corresponding to the address information of the origin site.

In one embodiment, the Internet acceleration platform includes one or more edge node servers, a plurality of intermediate node servers, and one or more back-to-origin node server. The route link includes a plurality of interconnected node servers. The Internet acceleration platform includes the plurality of route links.

Sub-step 8012: calculating a link parameter for each route link according to a pre-set shortest path algorithm.

In one example, the shortest path algorithm is the Dijkstra's Algorithm. The example is for illustrative purposes and the type of the shortest path algorithm is not intended to limit the present disclosure. For example, the shortest path algorithm may also be the Bellman-Ford Algorithm, the Floyd Algorithm, or the SPFA Algorithm.

In one example, the link parameter for each route link may be a link delay or both the link delay and a packet loss rate (e.g., calculating weights of the link delay and the packet loss rate). The type of the link parameter is not intended to limit the present disclosure and may be determined according to actual requirements.

Sub-step 8013: selecting the route transmission link according to the link parameter for each route link.

In one example, the link parameter is the link delay. The link delays of the plurality of route links are compared. The route link having the smallest link delay is selected. The example is for illustrative purposes and is not intended to limit the present disclosure.

Figure 9:
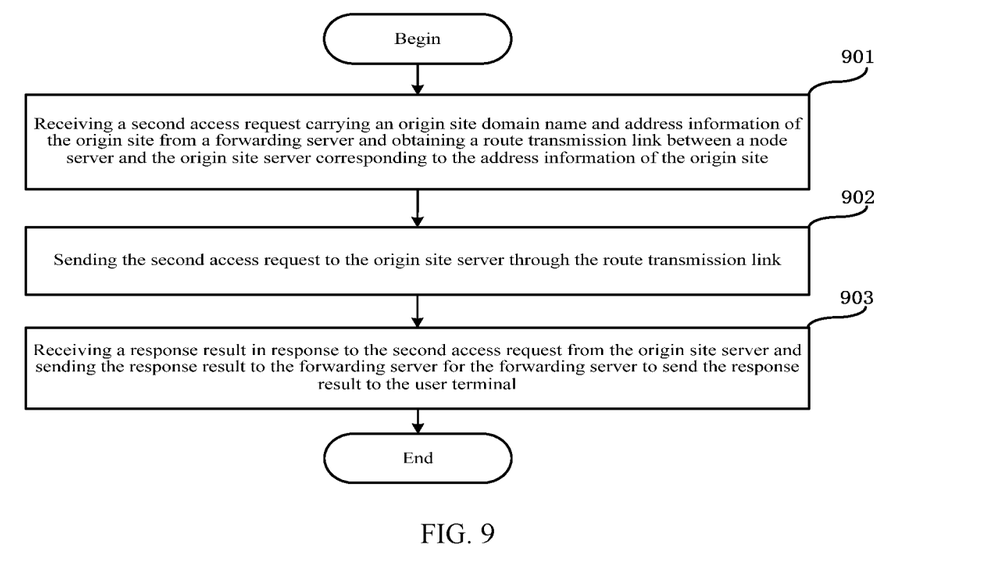
FIG. 9 illustrates a flowchart of another exemplary communication acceleration method according to disclosed embodiments of the present disclosure.

In one embodiment, as shown in FIG. 9, another communication acceleration method is provided. As shown in FIG. 8 and FIG. 9, step 901 and step 902 are identical to step 801 and step 802 and will not be repeated hereinafter. The method in FIG. 9 further includes the following steps.

Step 903: receiving a response result in response to the second access request from the origin site server and sending the response result to the forwarding server for the forwarding server to send the response result to the user terminal.

In one embodiment, after receiving the second access request, the origin site server searches for the corresponding resource locally and sending the resource, i.e., the response result, to the user terminal.

In one example, the response result returns back to the user terminal through an original route transmission link. As such, the response result can be transmitted to the user terminal through the route transmission link having a fast transmission speed and the user experience is further improved.

Practically, the method in FIG. 9 may also be improved over the method in FIG. 7.

Compared to the method in FIG. 7, the method in FIG. 9 provides the process of obtaining the route transmission link. That is, the node server obtains the plurality of route links between the node server and the origin site servers. The link parameter for each route link is calculated according to the pre-set shortest path algorithm. The route transmission link is selected according to the link parameter for each route link. As such, the second access request can be transmitted to the origin site server through the route transmission link having the fast transmission speed and the communication speed is further accelerated.

The present disclosure also provides a forwarding server. The forwarding server includes at least one processor and a memory connected to the at least one processor. The memory stores instructions to be executed by the at least one processor. The at least one processor executes the instructions to implement the network traffic forwarding method provided by the embodiments of the present disclosure.

Practically, the forwarding server may be a node server connected to the user terminal and the Internet acceleration platform, respectively.

The memory and the processor are connected by a bus. The bus may include any quantity of interconnected buses and bridges. The bus connects various circuits of one or more processors and the memory together. The bus may also connect the various other circuits of peripheral devices, voltage regulators, and power management circuits together. These circuits are well known in the art and thus will be further described. A bus interface is provided between the bus and a transceiver. The transceiver may be a component or a plurality of components, such as a plurality of receivers and transmitters, configured to communicate with communication units of other devices through a transmission medium. Data processed by the processor may be transmitted through a wired medium. Further, an antenna may receive the data and send the data to the processor.

The processor is responsible for managing the bus and other routine processing. The processor further provides various functions including timing, peripheral interfaces, voltage regulation, power management, and other control functions. The memory may be configured to store data used by the processor when performing operations.

Compared with the existing technology, the present disclosure provides the network traffic forwarding method to be applied to the forwarding server. That is, the first access request carrying the acceleration domain name is received from the user terminal. If it is determined that the origin site domain name corresponding to the acceleration domain name exists, the first pre-set rule is used to obtain the origin site domain name corresponding to the acceleration domain name. The second access request carrying the origin site domain name and the corresponding origin site address information is sent to the Internet acceleration platform. The Internet acceleration platform performs an Internet acceleration process in response to the second access request. The use of the Internet acceleration access device in the existing technology is replaced by the solution that forwards the access request from the user terminal to the Internet acceleration platform. As such, no longer limited by the Internet access scenarios, the user may enjoy the Internet acceleration service to meet the demand of fast accesses to designated websites in any scenarios. It is a great relief to the users by removing the hardware device deployed on the user side, satisfying the stringent information security requirement, and reducing the cost of the users.

The present disclosure also provides a user terminal. The user terminal includes at least one processor and a memory connected to the at least one processor. The memory stores instructions to be executed by the at least one processor. The at least one processor executes the instructions to implement the request sending method provided by the embodiments of the present disclosure.

The memory and the processor are connected by a bus. The bus may include any quantity of interconnected buses and bridges. The bus connects various circuits of one or more processors and the memory together. The bus may also connect the various other circuits of peripheral devices, voltage regulators, and power management circuits together. These circuits are well known in the art and thus will be further described. A bus interface is provided between the bus and a transceiver. The transceiver may be a component or a plurality of components, such as a plurality of receivers and transmitters, configured to communicate with communication units of other devices through a transmission medium. Data processed by the processor may be transmitted through a wired medium. Further, an antenna may receive the data and send the data to the processor.

The processor is responsible for managing the bus and other routine processing. The processor further provides various functions including timing, peripheral interfaces, voltage regulation, power management, and other control functions. The memory may be configured to store data used by the processor when performing operations.

Compared with the existing technology, the present disclosure provides the request sending method. That is, the second DNS resolution request is sent to the second DNS server. The address information of the forwarding server corresponding to the acceleration domain name is fed back by and received from the second DNS server. The first access request is sent to the forwarding server according to the address information of the forwarding server. The forwarding server forwards the second access request derived from the first access request to the Internet acceleration platform. As such, the user terminal achieves accessing the origin site server.

The present disclosure also provides a node server. The node server includes at least one processor and a memory connected to the at least one processor. The memory stores instructions to be executed by the at least one processor. The at least one processor executes the instructions to implement the communication acceleration method provided by the embodiments of the present disclosure.

The memory and the processor are connected by a bus. The bus may include any quantity of interconnected buses and bridges. The bus connects various circuits of one or more processors and the memory together. The bus may also connect the various other circuits of peripheral devices, voltage regulators, and power management circuits together. These circuits are well known in the art and thus will be further described. A bus interface is provided between the bus and a transceiver. The transceiver may be a component or a plurality of components, such as a plurality of receivers and transmitters, configured to communicate with communication units of other devices through a transmission medium. Data processed by the processor may be transmitted through a wired medium. Further, an antenna may receive the data and send the data to the processor.

The processor is responsible for managing the bus and other routine processing. The processor further provides various functions including timing, peripheral interfaces, voltage regulation, power management, and other control functions. The memory may be configured to store data used by the processor when performing operations.

Compared with the existing technology, the present disclosure provides the communication acceleration method to be applied to the node server. That is, the second access request is received from the forwarding server. The route transmission link between the node server and the origin site server corresponding to the address information of the origin site is obtained. The second access request is sent to the origin site server through the route transmission link. The Internet acceleration platform performs the accelerated transmission process on the access request forwarded by the forwarding server. As such, the user terminal can quickly access the origin site server to obtain the to-be-accessed resource.

The present disclosure also provides a computer readable storage medium configured to store a computer program. When being executed by a processor, the computer program implements the network traffic forwarding method provided by the embodiments of the present disclosure.

Compared with the existing technology, the present disclosure provides the network traffic forwarding method to be applied to the forwarding server. That is, the first access request carrying the acceleration domain name is received from the user terminal. If it is determined that the origin site domain name corresponding to the acceleration domain name exists, the first pre-set rule is used to obtain the origin site domain name corresponding to the acceleration domain name. The second access request carrying the origin site domain name and the corresponding origin site address information is sent to the Internet acceleration platform. The Internet acceleration platform performs an Internet acceleration process in response to the second access request. The use of the Internet acceleration access device in the existing technology is replaced by the solution that forwards the access request from the user terminal to the Internet acceleration platform. As such, no longer limited by the Internet access scenarios, the user may enjoy the Internet acceleration service to meet the demand of fast accesses to designated websites in any scenarios. It is a great relief to the users by removing the hardware device deployed on the user side, satisfying the stringent information security requirement, and reducing the cost of the users.

The present disclosure also provides a computer readable storage medium configured to store a computer program. When being executed by a processor, the computer program implements the request sending method provided by the embodiments of the present disclosure.

Compared with the existing technology, the present disclosure provides the request sending method. That is, the second DNS resolution request is sent to the second DNS server. The address information of the forwarding server corresponding to the acceleration domain name is fed back by and received from the second DNS server. The first access request is sent to the forwarding server according to the address information of the forwarding server. The forwarding server forwards the second access request derived from the first access request to the Internet acceleration platform. As such, the user terminal achieves accessing the origin site server.

The present disclosure also provides a computer readable storage medium configured to store a computer program. When being executed by a processor, the computer program implements the communication acceleration method provided by the embodiments of the present disclosure.

Compared with the existing technology, the present disclosure provides the communication acceleration method to be applied to the node server. That is, the second access request is received from the forwarding server. The route transmission link between the node server and the origin site server corresponding to the address information of the origin site is obtained. The second access request is sent to the origin site server through the route transmission link. The Internet acceleration platform performs the accelerated transmission process on the access request forwarded by the forwarding server. As such, the user terminal can quickly access the origin site server to obtain the to-be-accessed resource.

Those skilled in the art may appreciate that all or part of the steps in the embodiments of the present disclosure may be implemented by using programs to instruct relevant hardware. Stored in a computer readable storage medium, the programs may include a plurality of instructions, when being executed by a device (e.g., a single-chip computer, an IC chip, etc.) or a processor, configured to implement all or part of the steps in the embodiments of the present disclosure. The storage medium may include various media for storing program codes, such as a USB disk, a portable disk, a read-only memory (ROM), a random-access memory (RAM), a magnetic disk, or an optical disk.

It should be understood by those skilled in the art that the foregoing are merely certain preferred embodiments of the present disclosure and are not intended to limit the present invention. Without departing from the spirit and principles of the present disclosure, any modifications, equivalent substitutions, and improvements, etc. shall fall within the scope of the present disclosure.

What is claimed is:

1. A network traffic forwarding method to be applied to a forwarding server, comprising:
   receiving a first access request carrying an acceleration domain name from a user terminal and determining whether an origin site domain name corresponding to the acceleration domain name exists;
   if the origin site domain name exists, obtaining the origin site domain name corresponding to the acceleration domain name according to a first pre-set rule; and
   sending a second access request carrying the origin site domain name and corresponding origin site address information to an Internet acceleration platform to perform an accelerated transmission process in response to the second access request.

2. The method of claim 1, wherein obtaining the origin site domain name corresponding to the acceleration domain name according to the first pre-set rule includes:
   obtaining the origin site domain name corresponding to the acceleration domain name according to a pre-stored pre-set mapping relationship between the acceleration domain name and the origin site domain name.

3. The method of claim 2, wherein:
   the pre-set mapping relationship between the acceleration domain name and the origin site domain name is stored in a list;
   before obtaining the origin site domain name corresponding to the acceleration domain name according to the first pre-set rule, the method further includes:
      obtaining the number of times the acceleration domain name carried in the first access request is accessed; and
      based on the obtained number of times, sorting the list of the pre-set mapping relationship; and
   obtaining the origin site domain name corresponding to the acceleration domain name according to the pre-stored pre-set mapping relationship between the acceleration domain name and the origin site domain name includes:
      obtaining the origin site domain name corresponding to the acceleration domain name according to the sorted list.

4. The method of claim 1, wherein:
   before obtaining the origin site domain name corresponding to the acceleration domain name according to the first pre-set rule, the method further includes:
      receiving an update request of the first pre-set rule and updating the first pre-set rule corresponding to the acceleration domain name.

5. The method of claim 1, wherein:
   after sending the second access request carrying the origin site domain name and corresponding origin site address information to the Internet acceleration platform to perform the accelerated transmission process in response to the second access request, the method further includes:
      receiving a response result fed back by the origin site server from the Internet acceleration platform in response to the second access request and obtaining the origin site domain name from the response result;
      when it is determined the acceleration domain name corresponding to the origin site domain name exists, obtaining the acceleration domain name corresponding to the origin site domain name according to a second pre-set rule; and
      sending the response result carrying the acceleration domain name to the user terminal.

6. The method of claim 5, wherein:
   an object requested by the first access request is a page file; and
   obtaining the origin site domain name from the response result includes obtaining the origin site domain name by traversing the page file.

7. The method of claim 1, wherein:
   sending the second access request carrying the origin site domain name and corresponding origin site address information to the Internet acceleration platform includes:
      sending a first DNS resolution request carrying the origin site domain name to a first DNS server and receiving the corresponding origin site address information resolved according to the origin site domain name from the first DNS server; and
      sending the second access request carrying the origin site domain name and the corresponding origin site address information to the Internet acceleration platform.

8. A request sending method to be applied to a user terminal, comprising:
   sending a second DNS resolution request carrying an acceleration domain name to a second DNS server, and receiving address information of a forwarding server corresponding to the acceleration domain name fed back by the second DNS server; and
   sending a first access request carrying the acceleration domain name to the forwarding server according to the address information of the forwarding server for the forwarding server to forward a second access request derived from the first access request to an Internet acceleration platform.

9. The method of claim 8, wherein:
   an object requested by the first access request is a page file; and
   after sending the first access request carrying the acceleration domain name to the forwarding server according to the address information of the forwarding server, the method further includes:
      receiving the page file fed back by an origin site server from the forwarding server; and resolving the acceleration domain name included in the page file and sending the second DNS resolution request carrying the acceleration domain name to the second DNS server.

10. The method of claim 8, wherein:
an object requested by the first access request is a redirected URL; and
after sending the first access request carrying the acceleration domain name to the forwarding server according to the address information of the forwarding server, the method further includes:
  receiving the redirected URL and a status code indicating redirecting fed back by an origin site server from the forwarding server; and
  sending the second DNS resolution request carrying the acceleration domain name to the second DNS server according to the redirected URL and the status code indicating redirecting, wherein the redirected URL includes the acceleration domain name.

11. A communication acceleration method to be applied to a node server of an Internet acceleration platform, comprising:
  receiving a second access request carrying an origin site domain name and address information of the origin site from a forwarding server and obtaining a route transmission link between a node server and an origin site server corresponding to the address information of the origin site; and
  sending the second access request to the origin site server through the route transmission link.

12. The method of claim 11, wherein:
after sending the second access request to the origin site server through the route transmission link, the method further includes:
  receiving a response result from the origin site server in response to the second access request and sending the response result to the forwarding server for the forwarding server to send the response result to a user terminal.

13. The method of claim 12, wherein receiving the response result from the origin site server in response to the second access request includes:
  receiving the response result from the origin site server through the route transmission link.

14. The method of claim 11, wherein obtaining the route transmission link between the node server and the origin site server corresponding to the address information of the origin site includes:
  obtaining a plurality of route links between the node server and the origin site server corresponding to the address information of the origin site;
  calculating a link parameter for each route link according to a pre-set shortest path algorithm; and
  selecting the route transmission link according to the link parameter for each route link.

15. The method of claim 14, wherein:
the link parameter for each route link includes a route link delay or both the route link delay and a packet loss rate.

* * * * *